(12) United States Patent
Milton et al.

(10) Patent No.: US 10,497,998 B2
(45) Date of Patent: Dec. 3, 2019

(54) ELECTRIC BATTERY ASSEMBLY

(71) Applicant: Nikola Corporation, Phoenix, AZ (US)

(72) Inventors: Trevor R. Milton, Phoenix, AZ (US);
Kevin M. Lynk, Phoenix, AZ (US);
Anthony A. Heaton, Phoenix, AZ (US); Kyle Gray, Phoenix, AZ (US);
Robert Dane Davis, Phoenix, AZ (US)

(73) Assignee: Nikola Corporation, Phoenix, AZ (US)

(*) Notice: Subject to any disclaimer, the term of this patent is extended or adjusted under 35 U.S.C. 154(b) by 331 days.

(21) Appl. No.: 15/294,258

(22) Filed: Oct. 14, 2016

(65) Prior Publication Data

US 2017/0324128 A1    Nov. 9, 2017

Related U.S. Application Data

(63) Continuation-in-part of application No. 15/268,249, filed on Sep. 16, 2016.
(Continued)

(51) Int. Cl.
*H01M 10/6554* (2014.01)
*H01M 10/613* (2014.01)
(Continued)

(52) U.S. Cl.
CPC ........ *H01M 10/6554* (2015.04); *B60K 1/04* (2013.01); *B60L 50/66* (2019.02); *B60L 58/26* (2019.02); *H01M 2/1077* (2013.01); *H01M 2/1083* (2013.01); *H01M 2/206* (2013.01); *H01M 10/613* (2015.04); *H01M 10/625* (2015.04); *H01M 10/643* (2015.04); *H01M 10/6555* (2015.04); *H01M 10/6557* (2015.04);
(Continued)

(58) Field of Classification Search
CPC .......... H01M 10/6554; H01M 10/613; H01M 10/625; H01M 10/643; H01M 10/6555; H01M 10/6557; H01M 10/6567; H01M 10/653; H01M 10/6556; H01M 2/1077; H01M 2/1083; H01M 2/206; H01M 2220/20

See application file for complete search history.

(56) References Cited

U.S. PATENT DOCUMENTS 5,501,289 A    3/1996  Nishikawa et al.
6,190,795 B1   2/2001  Daley
(Continued)

FOREIGN PATENT DOCUMENTS

CN    201243042 Y     5/2009
DE    102010014081 A1  10/2011
(Continued)

*Primary Examiner* — Jane J Rhee
(74) *Attorney, Agent, or Firm* — Snell & Wilmer, L.L.P.

(57) ABSTRACT

A battery assembly is disclosed that includes a battery housing, a battery array, and one or more cooling plates. The battery housing forms a battery compartment having a width and length greater than a height. The battery array includes a plurality of cylindrical battery cells oriented with an axis perpendicular to the height of the battery compartment. The plurality of cells are organized into a plurality of rows within the battery compartment. The one or more cooling plates oriented perpendicular to the axis of the battery cells and positioned proximal to an end of battery cells within a row of the plurality of rows.

9 Claims, 17 Drawing Sheets

Related U.S. Application Data

(60) Provisional application No. 62/333,722, filed on May 9, 2016.

(51) Int. Cl.

| | | |
|---|---|---|
| *H01M 10/625* | (2014.01) | |
| *H01M 10/643* | (2014.01) | |
| *H01M 2/10* | (2006.01) | |
| *H01M 10/6567* | (2014.01) | |
| *B60K 1/04* | (2019.01) | |
| *H01M 2/20* | (2006.01) | |
| *H01M 10/6557* | (2014.01) | |
| *H01M 10/6555* | (2014.01) | |
| *B60L 58/26* | (2019.01) | |
| *B60L 50/60* | (2019.01) | |
| *H01M 10/653* | (2014.01) | |
| *H01M 10/6556* | (2014.01) | |
| *B60K 1/00* | (2006.01) | |

(52) U.S. Cl.
 CPC ... *H01M 10/6567* (2015.04); *B60K 2001/005* (2013.01); *B60K 2001/0438* (2013.01); *B60K 2001/0472* (2013.01); *B60Y 2200/124* (2013.01); *B60Y 2200/20* (2013.01); *B60Y 2306/01* (2013.01); *B60Y 2306/05* (2013.01); *B60Y 2400/112* (2013.01); *H01M 10/653* (2015.04); *H01M 10/6556* (2015.04); *H01M 2220/20* (2013.01)

(56) References Cited

U.S. PATENT DOCUMENTS

| | | |
|---|---|---|
| 6,465,123 B1 | 10/2002 | Baumann et al. |
| 8,905,423 B2 | 12/2014 | Hart |
| 9,283,837 B1 | 3/2016 | Rawlinson |
| 2006/0220405 A1 | 10/2006 | Ohe et al. |
| 2007/0087266 A1 | 4/2007 | Bourket et al. |
| 2008/0133470 A1 | 9/2008 | Zhu et al. |
| 2008/0233470 A1 | 9/2008 | Zhu et al. |
| 2011/0168468 A1 | 7/2011 | Taguchi et al. |
| 2012/0028099 A1* | 2/2012 | Aoki ............ H01M 2/1077 429/120 |
| 2012/0040237 A1 | 2/2012 | Hamada et al. |
| 2013/0062939 A1 | 3/2013 | Engler et al. |
| 2013/0157098 A1 | 6/2013 | McLaughlin et al. |
| 2013/0284528 A1 | 10/2013 | Kawasaki et al. |
| 2015/0111074 A1 | 4/2015 | Boddakayala et al. |
| 2015/0135939 A1 | 5/2015 | Rawlinson |
| 2016/0214475 A1 | 7/2016 | Rawlinson |
| 2017/0320381 A1 | 11/2017 | Milton et al. |
| 2018/0261899 A1 | 9/2018 | Milton et al. |

FOREIGN PATENT DOCUMENTS

| | | |
|---|---|---|
| WO | 2017004078 A1 | 1/2017 |
| WO | WO/2017004078 A1 | 1/2017 |
| WO | WO/2017196799 A1 | 11/2017 |
| WO | WO/2017196801 A1 | 11/2017 |

* cited by examiner

ELECTRIC BATTERY ASSEMBLY

CROSS-REFERENCE TO RELATED APPLICATIONS

This application is a continuation-in-part of co-pending U.S. patent application Ser. No. 15/268,249, filed Sep. 16, 2016, now U.S. Pat. No. 10,308,132 entitled "ELECTRIC UTILITY TERRAIN VEHICLE," which is hereby incorporated by reference herein in its entirety, including but not limited to those portions that specifically appear hereinafter, the incorporation by reference being made with the following exception: In the event that any portion of the above-referenced application is inconsistent with this application, this application supersedes said portion of said above-referenced application.

This application also claims the benefit of U.S. Provisional Application No. 62/333,722, filed May 9, 2016, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The disclosure relates generally to systems, methods, and devices for batteries, and more particularly, but not necessarily entirely to an electric battery that may be used for an electric vehicle, such as a utility terrain vehicle or a utility task vehicle ("UTV").

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. The features and advantages of the disclosure will become apparent from consideration of the description and accompanying drawings where.

DETAILED DESCRIPTION

Figure 1:
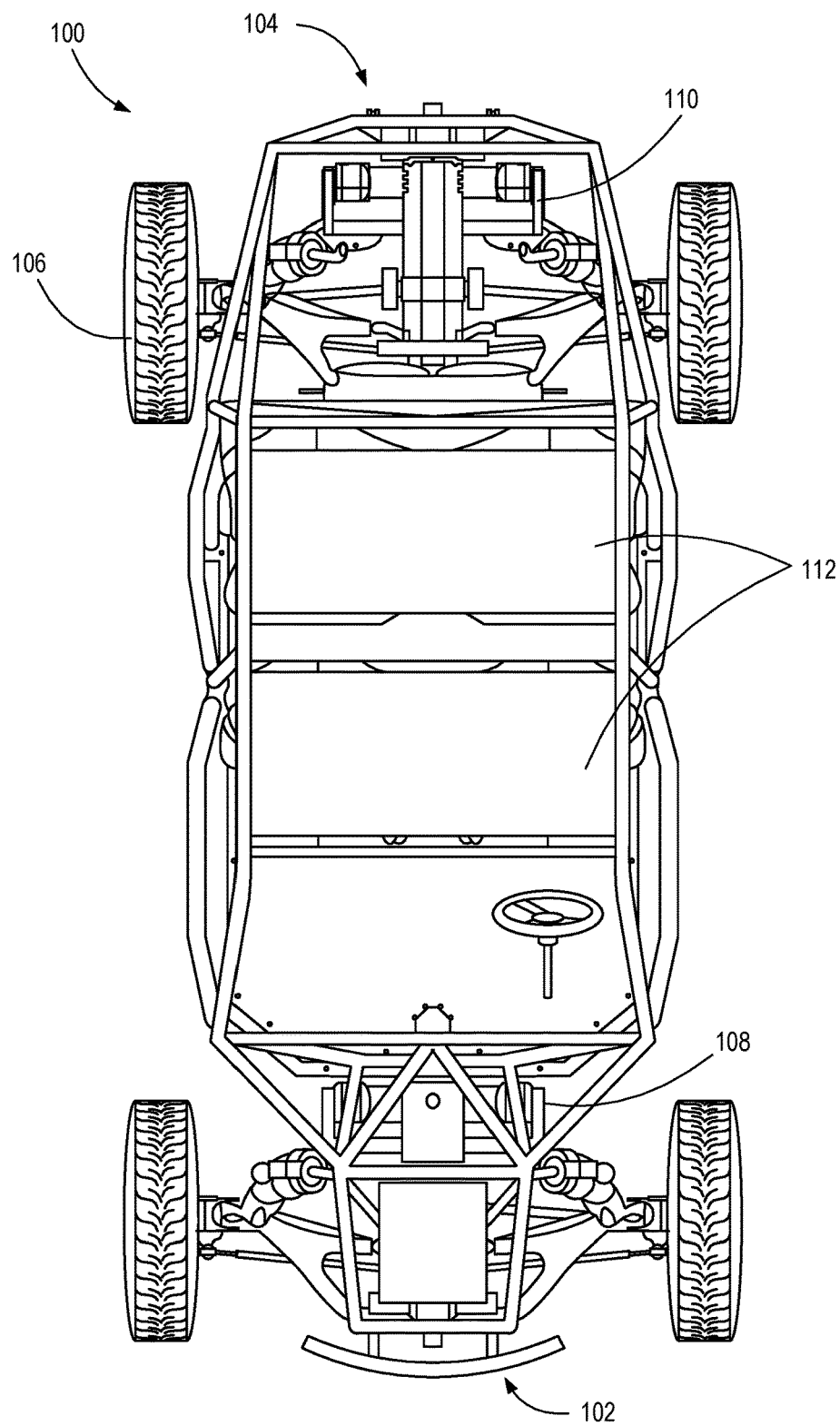
FIG. 1 is a top view of an embodiment of a UTV, side-by-side automobile made in accordance with the teachings and principles of the disclosure.

The disclosure relates generally to systems, methods, and devices for an electric battery. In one embodiment, an electric battery may be used for an electric vehicle, such as a utility terrain vehicle or a utility task vehicle (UTV). UTVs generally include vehicles in which a user and/or a passenger ride in a sitting position on a chair or seat and that is used for utility, off-road, or other purposes. The term UTV as used herein is given to include vehicles known as side-by-sides, recreational off-highway vehicles (ROVs), multipurpose off-highway utility vehicle (MOHUVs), and the like. UTVs may be considered more comfortable for riding than all-terrain vehicles (ATVs), such as four wheelers, due to their seated position. Although UTVs are generally smaller than road or highway vehicles they often have increased passenger or payload capacity over ATVs while maintaining a lower weight and/or lower center of gravity than highway vehicles.

Applicant has developed, and herein discloses, systems, methods and devices for an electric battery. In one embodiment, a battery assembly includes a battery housing, a battery array, and one or more cooling plates. The battery housing forms a battery compartment having a width and length greater than a height. The battery array includes a plurality of cylindrical battery cells oriented with an axis perpendicular to the height of the battery compartment. The plurality of cells is organized into a plurality of rows within the battery compartment. The one or more cooling plates are oriented perpendicular to the axis of the battery cells and positioned proximal to an end of battery cells within a row of the plurality of rows.

Positioning cells as in horizontally stacked rows can provide improved flexibility in capacity and even weight distribution. For example, with stacked rows of battery cells, the depth of the rows can be varied as needed for different voltages, capacity, or required output amperage. Deeper stacks will result in higher voltages, amperage, or overall battery capacity, while more shallow stacks can lead to lower weight. Horizontal battery cells organized into rows may be especially beneficial in a battery array form factor having a height much less than a length and width (e.g., such as in a pancake style battery). Because the driving efficiency and overall driving range is based on weight as well as battery capacity, the depth of the cells may be varied as needed to get the desired performance or driving range. Because the cells are oriented in rows, even weight distribution can be obtained even with different numbers of batteries. If the battery cells were oriented vertically, it may be necessary to have some portions of the battery compartment completely empty of batteries if less than full battery capacity is desired, thus leading to a variation in weight distribution.

Stacked rows of cells with cooling plates positioned between them may lead to more efficient cooling. For example, cooling plates positioned near an end of a cylindrical cell (e.g., and perpendicular to an axis of the cell) may more efficiently draw out heat from the batteries than cooling plates that are parallel to an axis of the cylindrical cell. In at least some cases, cylindrical cells generate head near the ends and also may radiate heat more efficiently through the ends. Furthermore, a single cooling plate may be used to cool more than one row of cells. For example, a cooling plate positioned between rows may draw heat from an end of a first row and from an end of a second row. Thus, improved cooling may be achieved in addition to space savings and efficiency by having one plate cool two rows of batteries.

Embodiments may also provide more secure and robust positioning of cells. If a battery assembly is used in a UTV or other vehicle, vibrations may jostle cells or other electrical connections loose if they are not sufficiently robust. In one embodiment, bus bars substantially parallel to cooling plates may include sheets of conductive metal that are welded or soldered to the electrodes of the cells. The conductive sheet bus bars may be positioned between the cooling plates and the cells and the bus bars may provide structural support to securely hold the cells in place. The bus bars and the welds/soldering may allow for cells to be securely held even when the rows of cells are not stacked to a full height of a battery compartment. For example, if the rows of cells are not stacked to a full height, there may be room for the cells to vibrate or shake if they were not welded/soldered into place on the bus bar sheets.

In one embodiment, the battery assembly is located laterally with respect to the frame or frame rails and may allow for a larger battery and a lower center of gravity for a UTV. For example, the battery assembly may be positioned horizontally between one or more frame rails and thereby be positioned below a cabin, such as below the feet of a passenger of the UTV. This positioning can lead to a significantly lower center of gravity than would be possible if a frame for gas UTVs is used and batteries were placed in a trunk (e.g., payload), passenger, or engine area. The area between the frame rails and/or below the cabin may provide a volume for a large battery array to improve power output, performance, and time between recharges. In one embodiment, the battery assembly provides an output voltage of 400 volts to improve performance.

In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

It is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting.

In describing the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps. As used herein, the phrase "consisting of" and grammatical equivalents thereof exclude any element, step, or material not specified in the claim. As used herein, the phrase "consisting essentially of" and grammatical equivalents thereof limit the scope of a claim to the specified materials or steps and those that do not materially affect the basic and novel characteristic or characteristics of the claimed disclosure.

Figure 2:
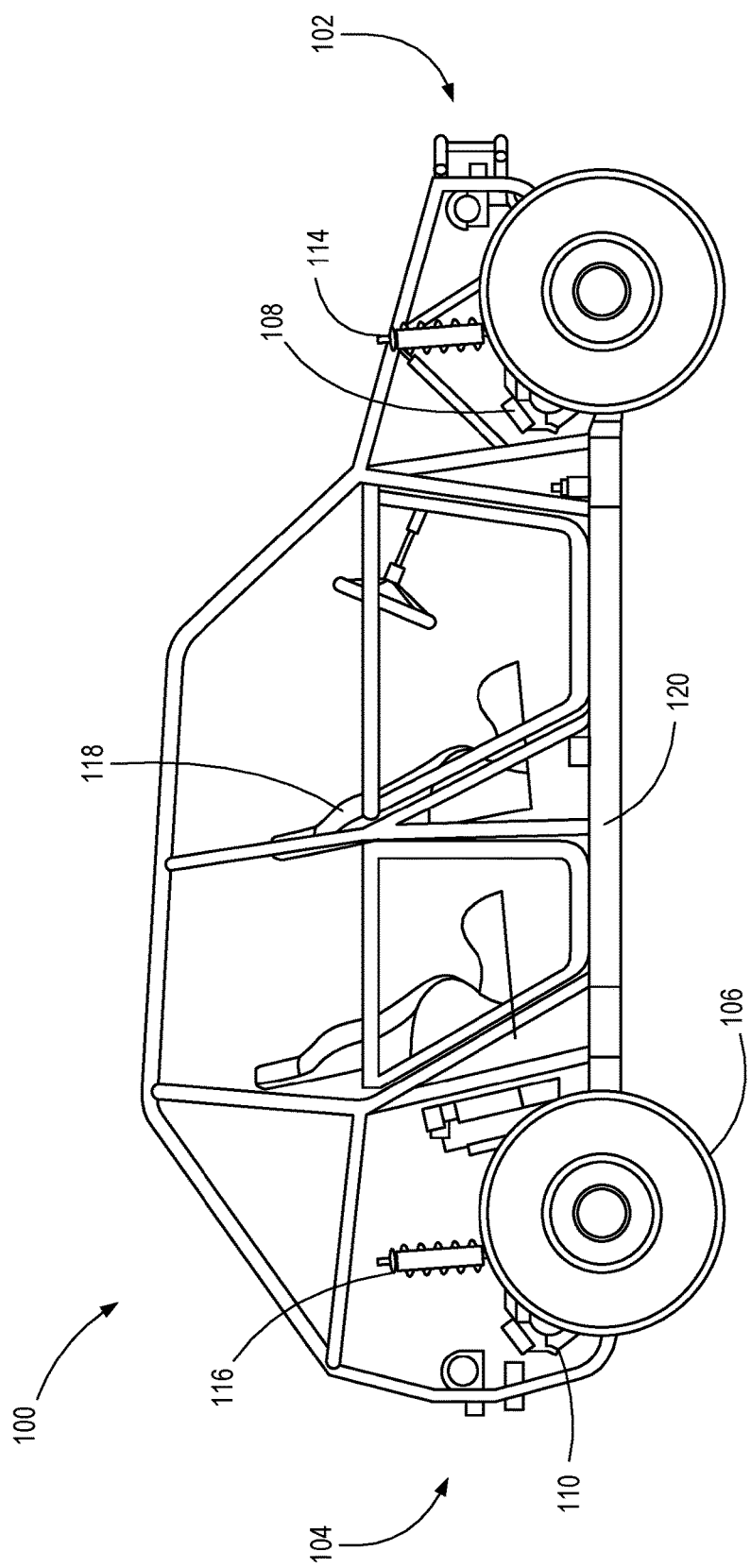
FIG. 2 is a side view of an embodiment of a UTV, side-by-side automobile made in accordance with the teachings and principles of the disclosure.
Figure 3:
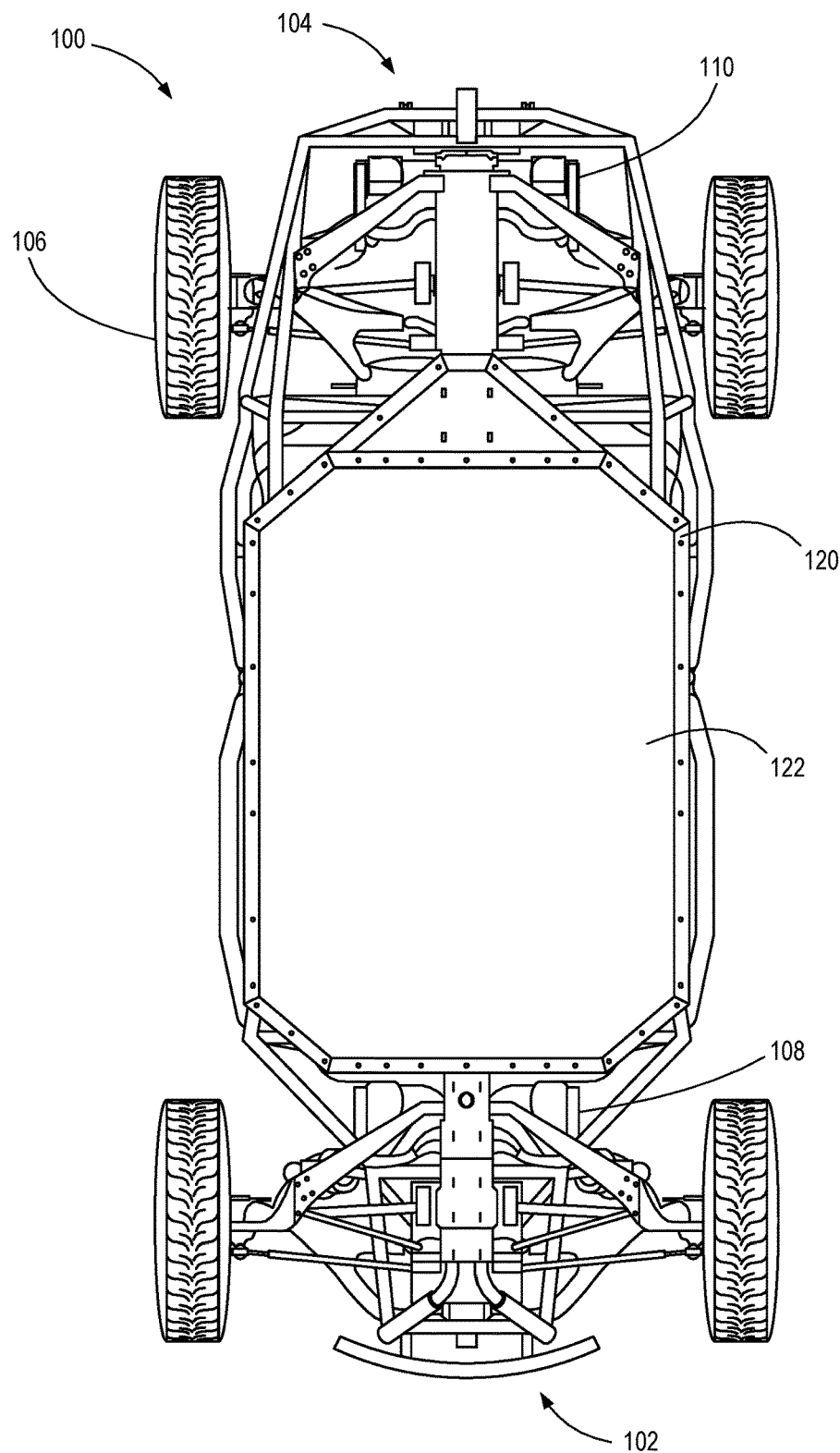
FIG. 3 is a bottom view of an embodiment of a UTV, side-by-side automobile made in accordance with the teachings and principles of the disclosure.
Figure 4:
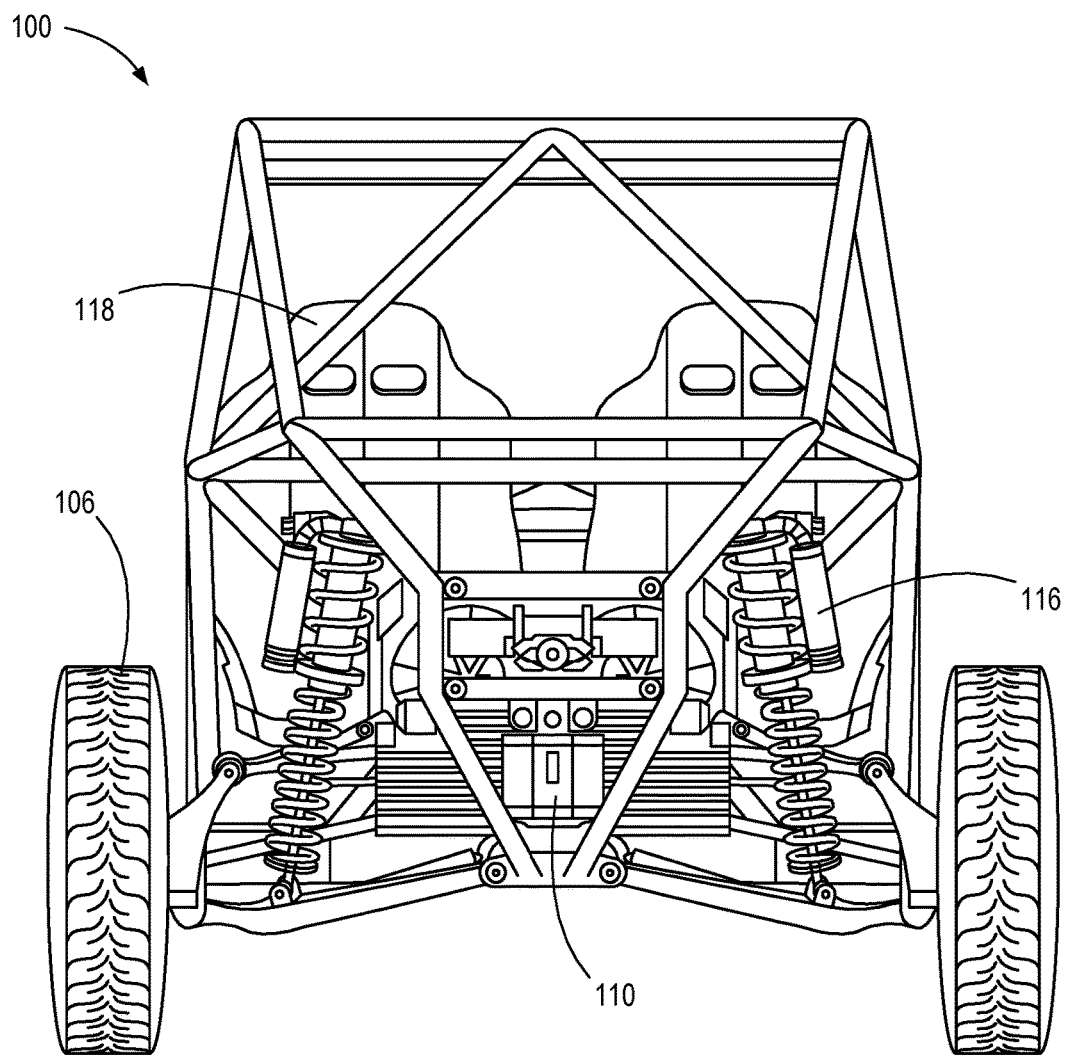
FIG. 4 is a rear view of an embodiment of a UTV, side-by-side automobile made in accordance with the teachings and principles of the disclosure.
Figure 5:
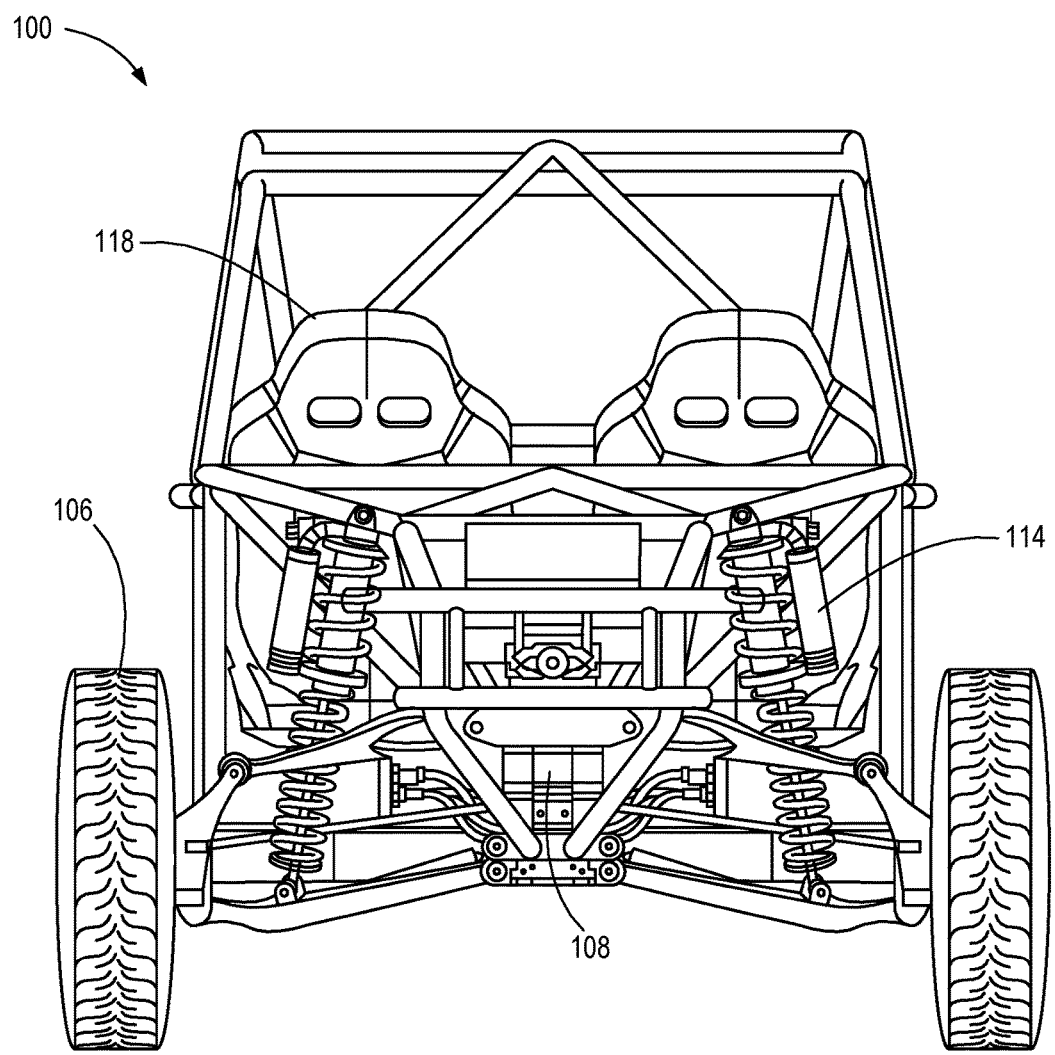
FIG. 5 is a front view of an embodiment of a UTV, side-by-side automobile made in accordance with the teachings and principles of the disclosure.
Figure 6:
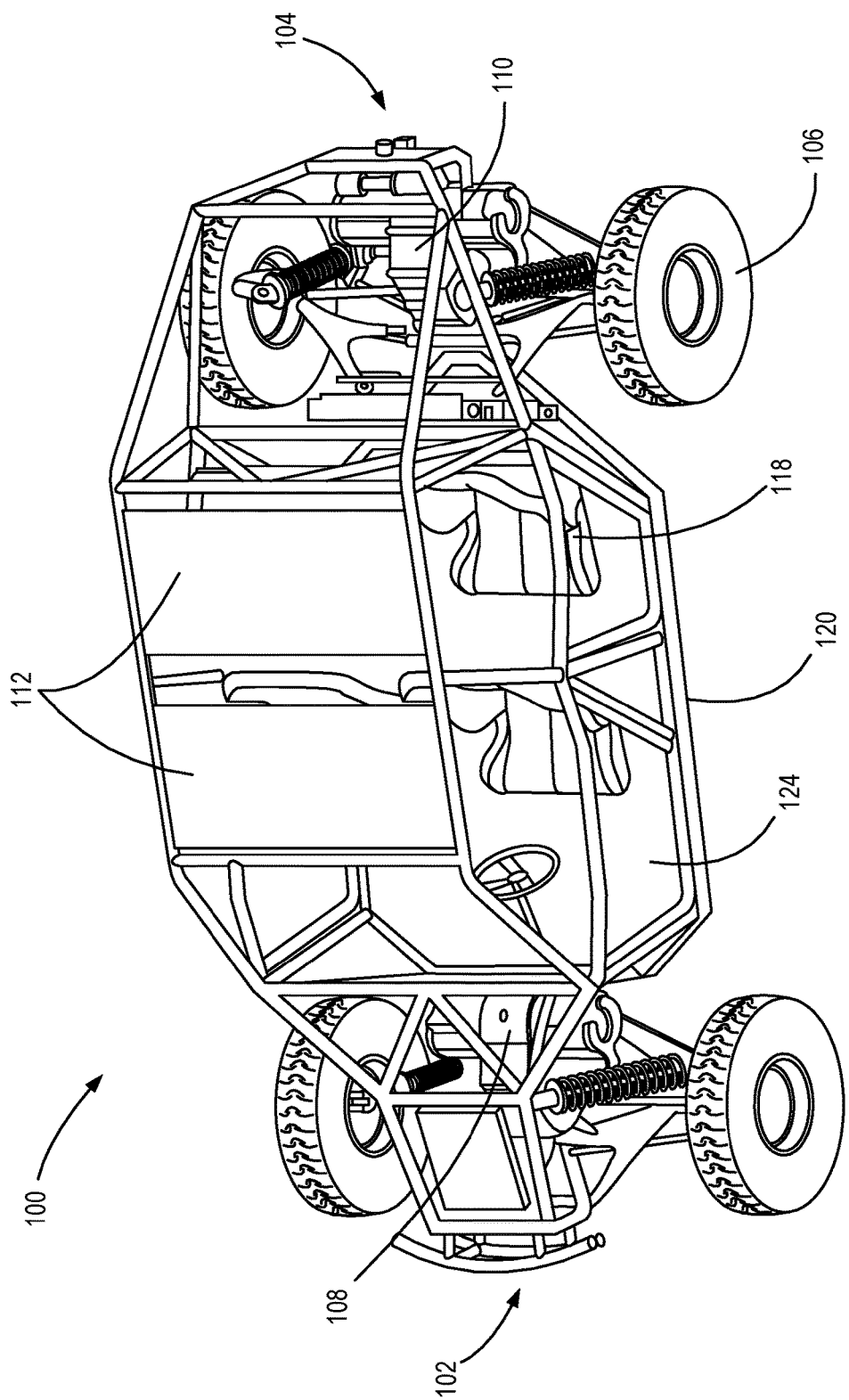
FIG. 6 is a perspective top view of an embodiment of a UTV, side-by-side automobile made in accordance with the teachings and principles of the disclosure.
Figure 7:
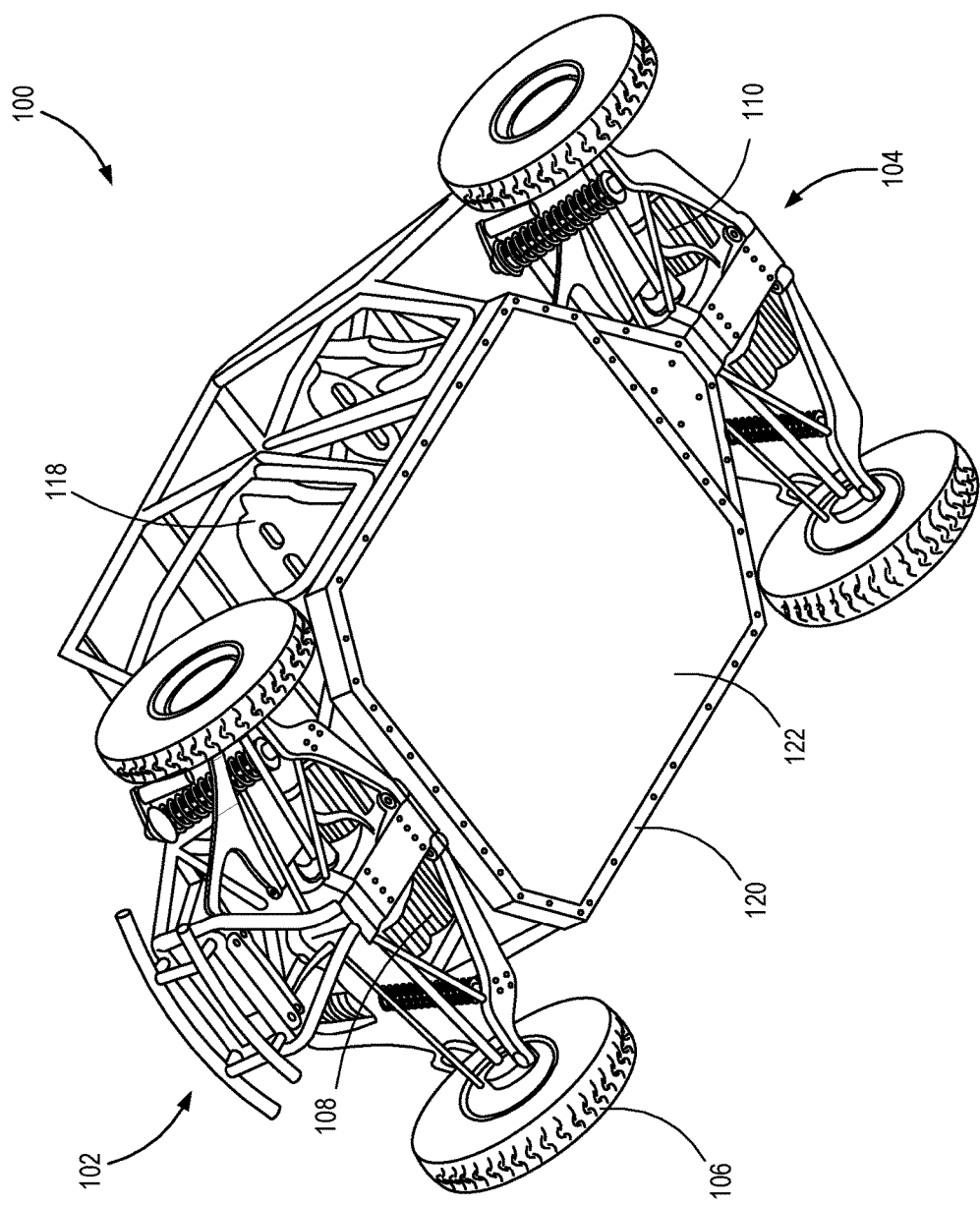
FIG. 7 is a perspective bottom view of an embodiment of a UTV, side-by-side automobile made in accordance with the teachings and principles of the disclosure.

Referring now to the figures, FIGS. 1-7 illustrate one embodiment of a UTV 100 according to the teachings and principles of the disclosure. FIG. 1 illustrates a top view. FIG. 2 illustrates a right/side view. FIG. 3 illustrates a bottom view. FIG. 4 illustrates a rear view. FIG. 5 illustrates a front view. FIG. 6 illustrates a perspective top view and FIG. 7 illustrates a perspective bottom view. FIGS. 1-7 illustrate different views of similar, but not necessarily identical, embodiments.

The UTV 100 includes a front end 102, a back end 104, and a plurality of wheels 106. A front gearbox assembly 108 houses motors and gears for driving the front wheels 106 and a rear gearbox assembly 110 houses motors and gears for driving the rear wheels 106. Roof panels 112 may include a solar array or solar panel for generating electricity from solar light and energy for powering or recharging electrical components of the UTV 100. Front suspension 114 and rear suspension 116 provide suspension and dampening for the vehicle. The front and rear suspension 114, 116 may be much larger than may otherwise be possible due to the compact front and rear gearbox assemblies 108, 110.

A frame 120 may attach and secure other portions of the UTV 100 with respect to each other. A plurality of chairs within a cabin or occupancy area may accommodate a driver and one or more passengers in one or more seats 118 below the roof panels 112 and above a cabin floor 124. A skid plate 122 on an underside of the vehicle 100 and below the cabin may protect a battery assembly or other components underneath the cabin. In one embodiment, a battery assembly (not shown) is positioned between the cabin floor 124 and the skid plate 122.

Figure 8:
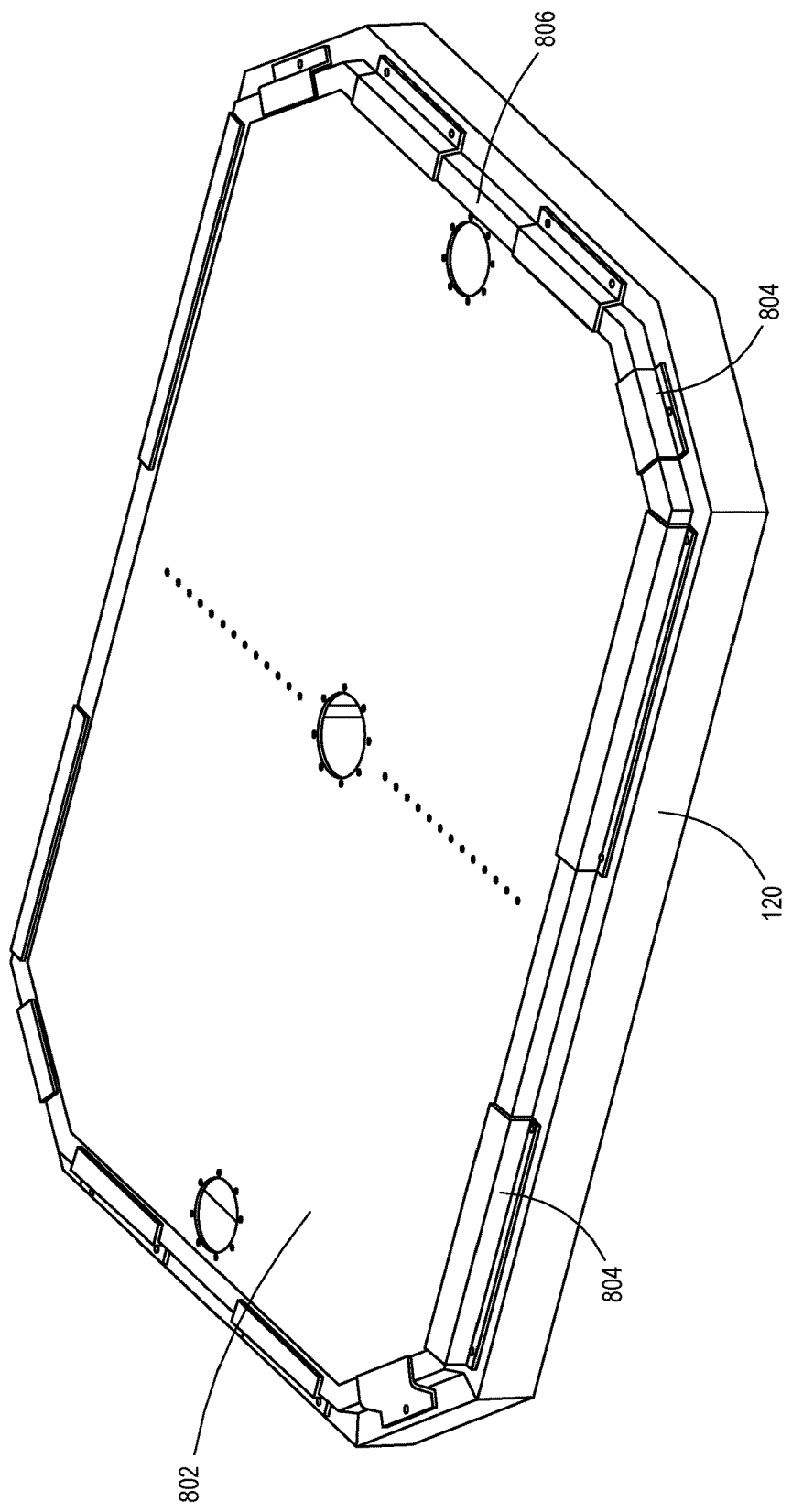
FIG. 8 is a perspective view an embodiment of a skid plate and battery array compartment of a UTV, side-by-side automobile made in accordance with the teachings and principles of the disclosure.

FIG. 8 illustrates a perspective view of a battery assembly 802 attached within a portion of a frame 120. The battery assembly 802 is pancake style having a large length and width, but narrow height. Only a portion of the frame 120 is shown for simplicity in illustration. The battery assembly 802 may serve as a cabin floor 124 or may be located underneath a cabin floor 124. For example, a layer of metal, rubber, carpet, or other material may overlay the battery assembly 802 within the cabin to form the cabin floor 124. The battery assembly 802 is attached to the frame 120 using support brackets 804. The support brackets 804 support the battery assembly 802 with respect to the frame 120 or frame rails. In one embodiment, the support brackets 804 support the battery assembly 802 between rails of the frame 120 so that the battery assembly 802 is located substantially horizontally or latterly neighboring the frame or frame rails.

A rubber isolator 806 is positioned between the support brackets 804 and the battery assembly 802 to reduce the transfer of vibrations between the frame 120 and the battery assembly 802. Other embodiments may include a layer of rubber, or another vibration absorbing material or mechanism, positioned between the battery assembly and the frame to reduce an amount of vibrations present in the frame from being transferred to the battery assembly 802.

Figure 9:
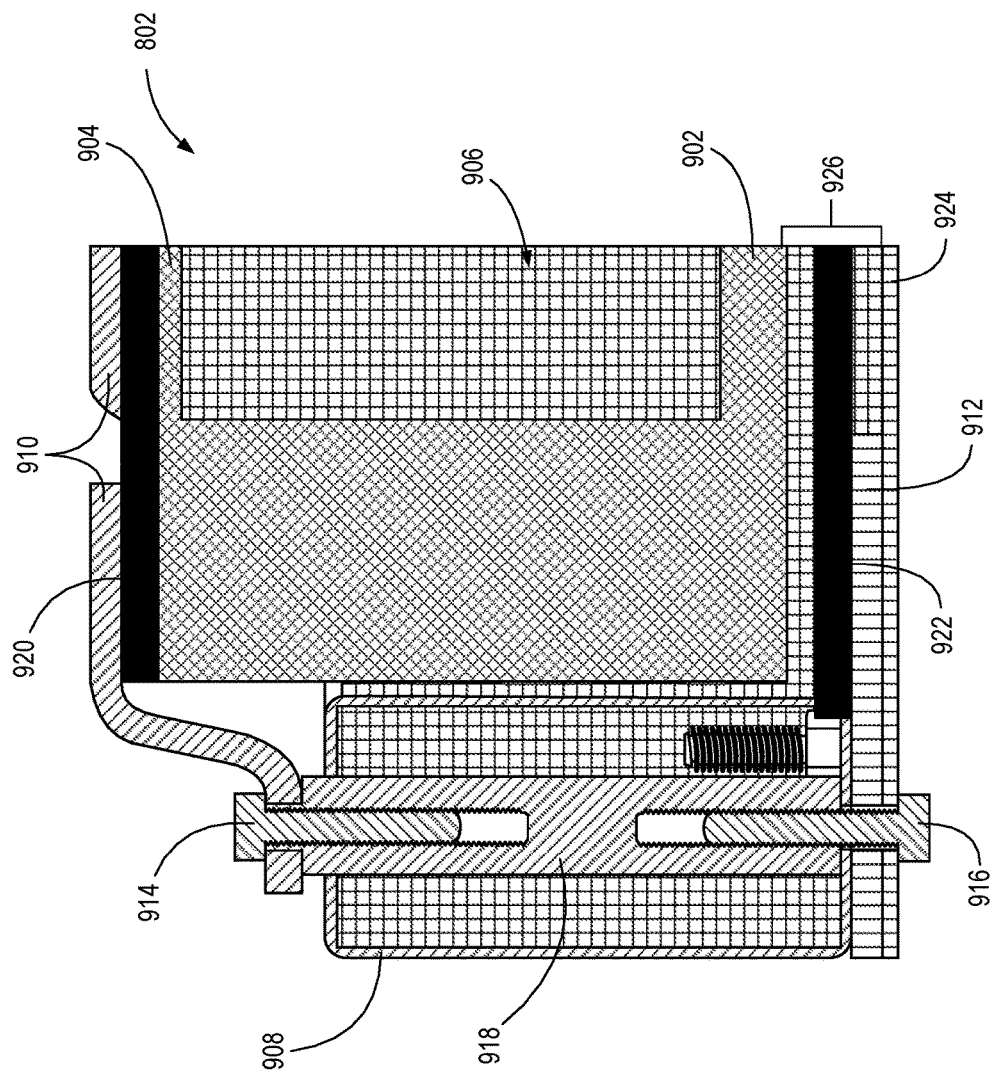
FIG. 9 is a side, partial cross-sectional view of a skid plate and battery array compartment of a UTV, side-by-side automobile made in accordance with the teachings and principles of the disclosure.

FIG. 9 illustrates a cross-sectional side view of a frame rail 908 and a portion of the battery assembly 802. The battery assembly 802 includes a battery box 902 and a battery box lid 904 that form a battery array compartment 906 where a battery array (not shown) may be placed. The battery box 902 and battery box lid 904 are secured to a frame rail 908 using an upper support battery clamp bracket 910, a lower battery support clamp plate 912, and corresponding upper and lower mounting bolts 914, 916. The upper and lower mounting bolts 914, 916 include threads matching threaded holes in a spacer 918 welded within the frame rail 908. As will be understood by one of skill in the art in light of the disclosure, a plurality of frame rails, bolts, and brackets may be used to secure the battery assembly 802 to a frame at various locations.

Isolators, which may include pieces or sheets of rubber, may be positioned between the upper support battery clamp bracket 910 a lower battery support clamp plate 912 and the battery assembly 802 (e.g., the battery box 902 and the battery box lid 904) to dampen vibrations. An upper isolator 920 is shown clamped between the battery box lid 904 and the upper support battery clamp bracket 910. A lower isolator 922 is shown clamped between the battery box 902 and the lower battery support clamp plate 912. Additional isolators may be positioned horizontally between the battery box 902 and the frame rail 908.

A skid plate 924 (see e.g., skid plate 122 of FIGS. 3 and 7) is also secured to the frame. The skid plate 924 is positioned beneath the battery box 902 to protect the battery assembly 802 from impacts from below a UTV 100. For example, rocks, or the ground surface may impact an underside of a UTV 100, risking damage to the battery box 902, internal battery cells, or other parts of the battery assembly 802. With the skid plate 924 secured below the battery assembly 802 damage to the battery assembly 802 may be avoided or reduced. In one embodiment, the skid plate 924 is secured with a gap 926 between the skid plate 924 and the battery box 902. The gap 926 may further limit damage that may occur if impact with an object occurs because the skid plate 924 may flex, stretch, or absorb the damage before any impact with the battery box 902 occurs.

Thus, the battery box 902 is clamped from top and bottom with an isolator on both sides. This will separate the frame torsion modes from the battery assembly 802. This approach will ensure that a battery pack is well secured and isolated. The skid plate 924 could be replaced if required. With the skid plate 924 in place the battery is not the primary strike point for off road events. In one embodiment, isolation and protection of the battery assembly 802 is important for durability and longevity of the battery cells or battery array of the battery assembly 802. For example, reducing vibration or impact may reduce the chance that a battery cell is damaged or that electrical connections within the battery assembly 802 are broken.

Figure 10:
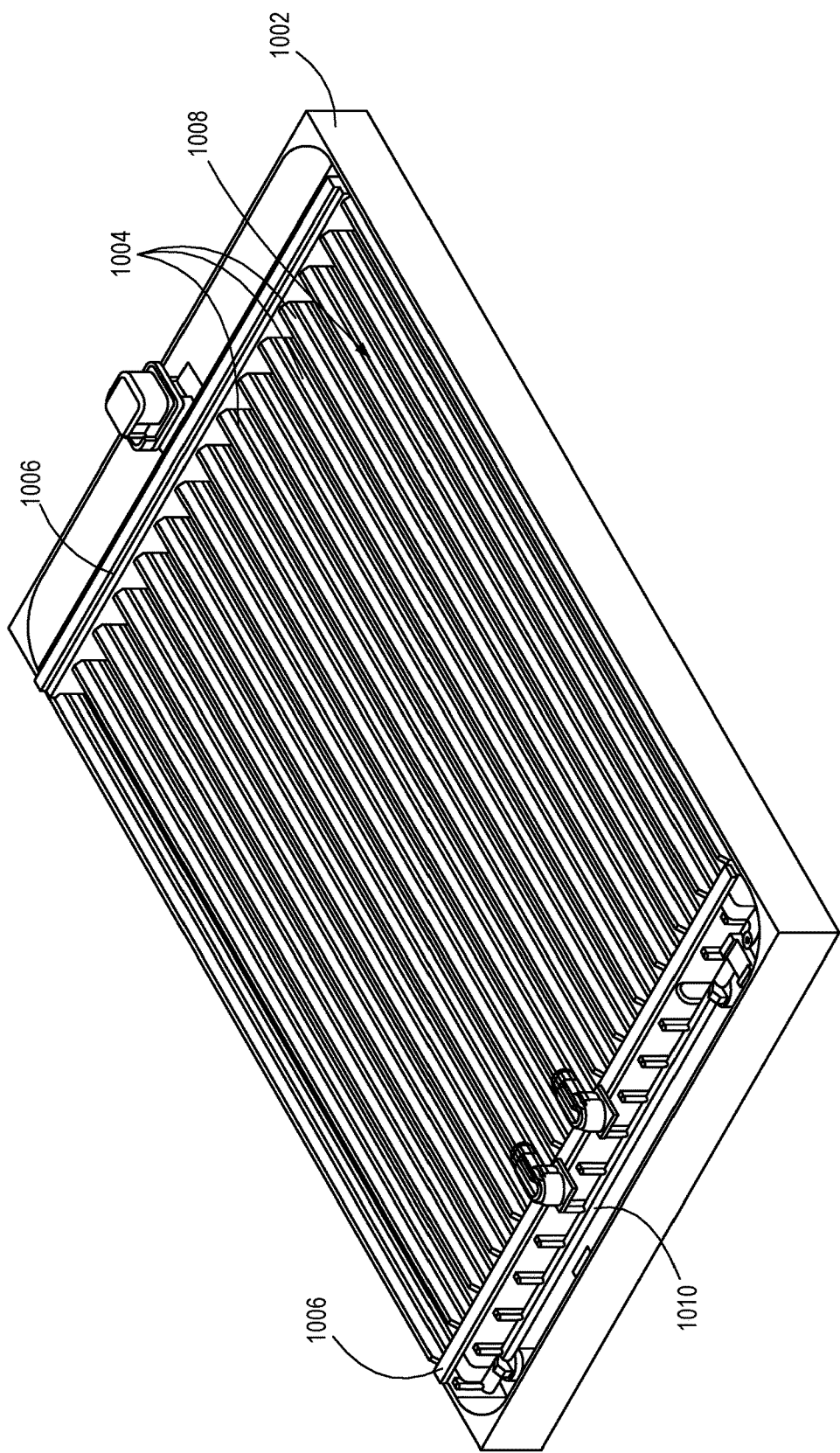
FIG. 10 is a perspective view of interior components of a battery array in accordance with the teachings and principles of the disclosure.

FIG. 10 illustrates a perspective view of components in an interior of a battery box 1002. Within the battery box 1002 are a plurality of cooling plates 1004. The cooling plates 1004 are connected to end plates 1006, which hold the cooling plates 1004 in place. A cooling pump may pump a coolant through the endplates 1006 and/or cooling plates 1004 to maintain temperature within a desired range. The cooling plates 1004 form gaps 1008 wherein where rows of battery cells (omitted for clarity) may be stacked. Also, a bus bar and thermal layer may be placed between the battery cells and the cooling plates. The bus bar may include a sheet of conductive material that electrically connects the batteries and the thermal layer may include a thermally conductive, but electrically insulating material to allow heat to pass from the battery cells and bus bar to the cooling plates 1004. Conductors 1010 may provide be provided to connect to bus bars or electrical components to allow power to be drawn from or input into the battery assembly.

Figure 11:
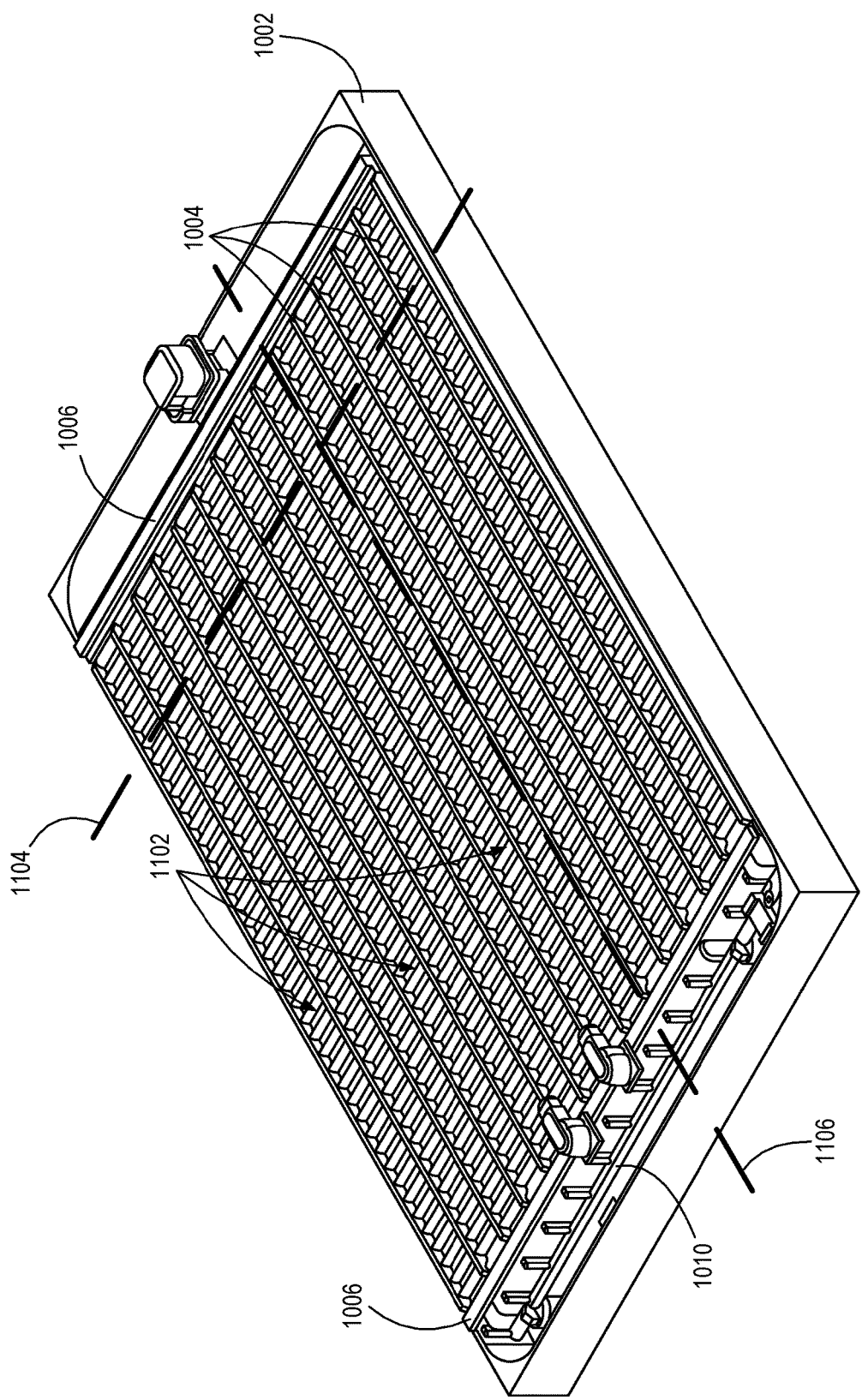
FIG. 11 is a perspective view of interior components of a battery array with battery cells installed in accordance with the teachings and principles of the disclosure.

FIG. 11 illustrates rows 1102 of battery cells positioned between the cooling plates 1004. In the depicted embodiment, 14 rows 1102 of battery cells are stacked between 15 cooling plates. Bus bars (obscured in FIG. 11) are positioned on each side of each row 1102 of battery cells to provide electrical connection to the battery cells. The arrangement as illustrated in FIG. 11 provides significant benefits. For example, the cooling plates 1004 are positioned through the middle of a battery compartment and thus are able to cool an interior of a battery assembly (e.g., between each row) rather than just the edges of a battery assembly. The cooling plates thus cool an interior and heat build-up is extremely uniform and easily managed.

Additionally, due to the rows 1102 including stacks of horizontally oriented battery cells, the number of battery cells in a row, and thus an overall battery assembly, is easily configurable and modifiable. For example, the number of battery cells may be modified as needed to provide the optimal electrical storage to overall weight ratio for a battery. In the case of usage as a UTV battery, the performance of the UTV may be tuned to exact needs and weights because the amount of cells included in the battery assembly is so easy to vary. For example, the battery cells included may depend on the configuration, weight, or performance characteristics desired for a specific UTV.

Figure 12:
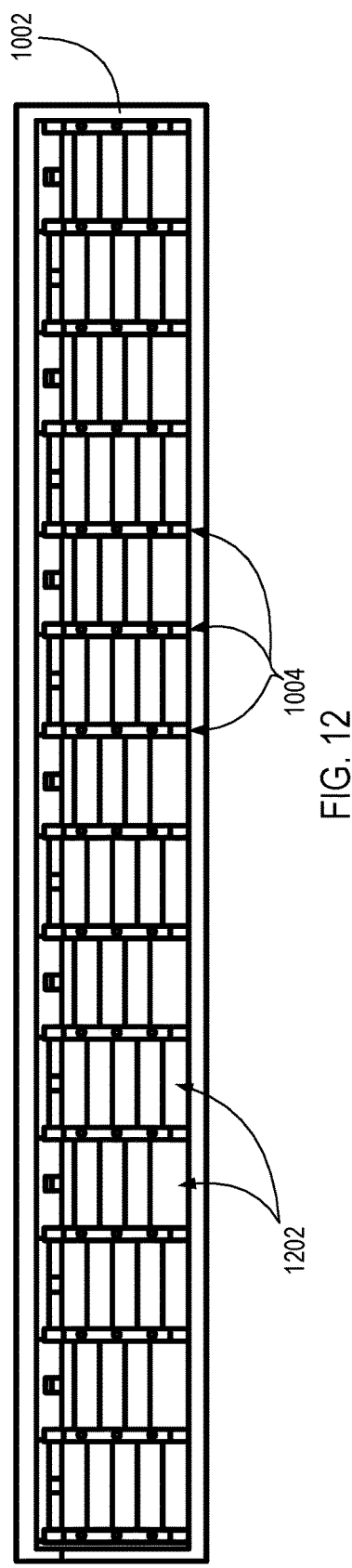
FIG. 12 is a cross-sectional side view of interior components of a battery array in accordance with the teachings and principles of the disclosure.

FIG. 12 is a side view of the battery assembly of FIG. 11 taken along line 1104. Battery cells 1202 are stacked in rows between a plurality of cooling plates 1004. The battery cells 1202 and cooling plates 1004 are located in a battery compartment of a housing or battery box 1002. A bus bar (not shown) and a thermal filler (not shown) may be positioned between the battery cells 1202 and the cooling plates 1004.

Figure 13:
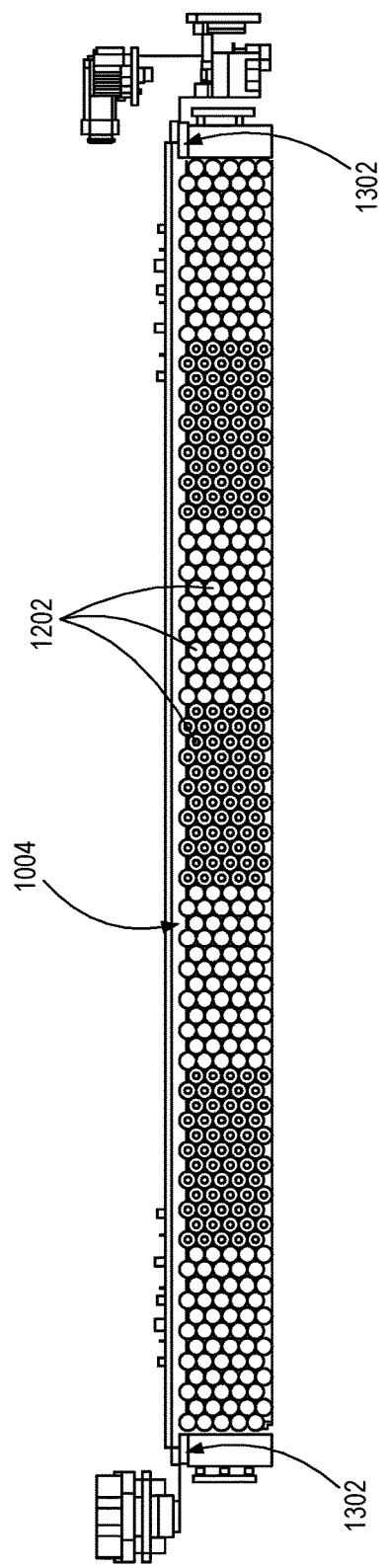
FIG. 13 is another cross-sectional side view of interior components of a battery array in accordance with the teachings and principles of the disclosure.

FIG. 13 is a cross-sectional side view of the battery assembly of FIG. 11 taken along line 1106. Battery cells 1202 from a single row are shown. The battery cells 1202 are stacked up to approximately a height of the cooling plates 1004. In another embodiment, the battery cells 1202 may be stacked up to less than the height of the cooling plates 1004 to allow for a desired reduced battery capacity or weight. Battery contacts 1302 provide an electrical connection to draw energy from or recharge the battery cells 1202.

Figure 14:
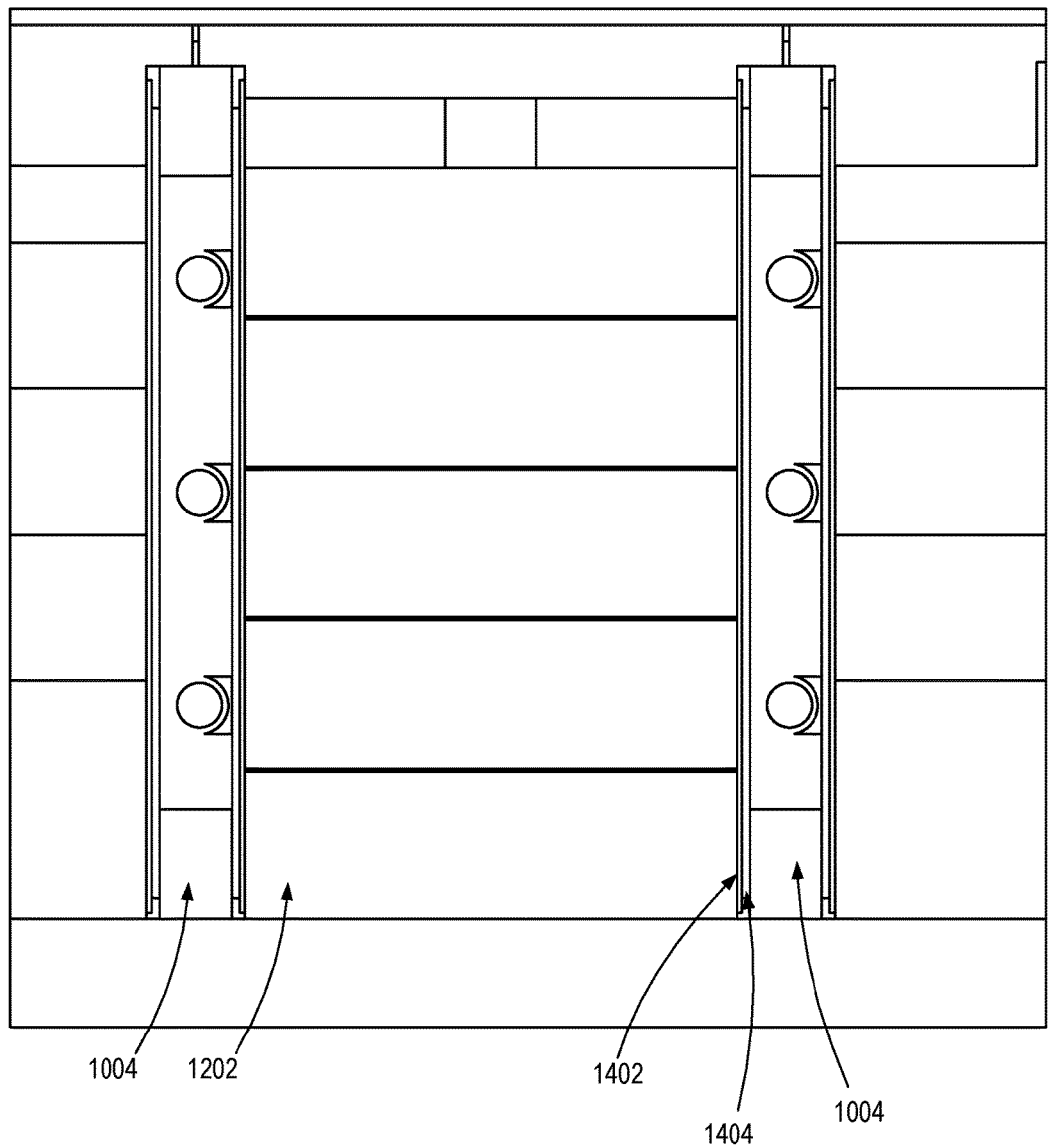
FIG. 14 is an enlarged cross-sectional side view of a portion of the battery assembly in accordance with the teachings and principles of the disclosure.

FIG. 14 is an enlarged view of rows of battery cells 1202 positioned between cooling plates 1004. A bus bar 1402 is positioned next to the battery cells 1202. The battery cells 1202 may be welded or soldered to the bus bar 1402. A thermal layer 1404 (thermally conductive, but electrically isolating) is positioned between the bus bar 1402 and the cooling plates 1004. Because the cooling plates 1004 may be conductive, the thermal layer 1404 keeps electrical energy from flowing from the battery cells 1202 or bus bar 1402 onto the cooling plates 1004.

Figure 15:
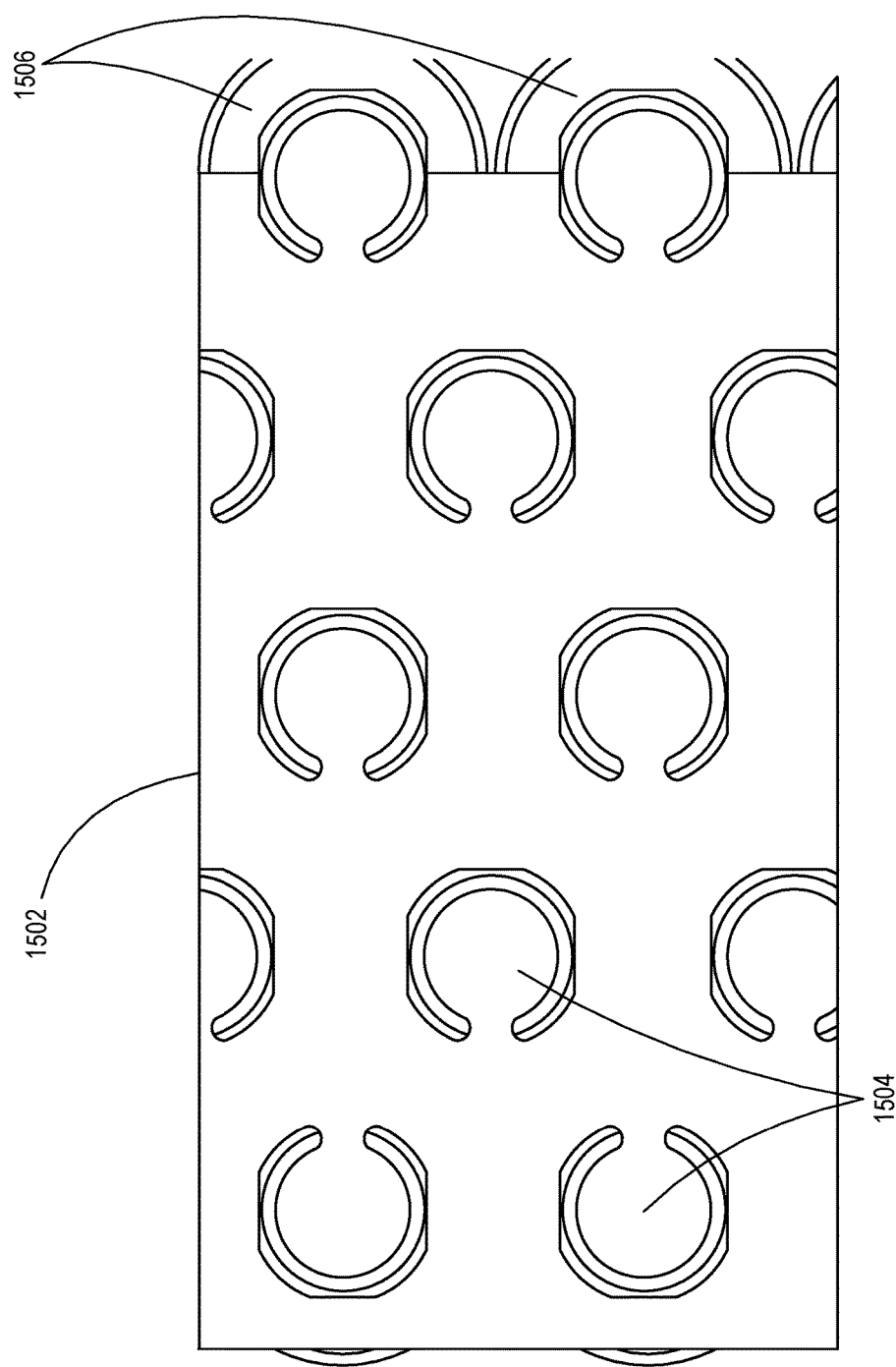
FIG. 15 is an enlarged plan view of a portion of a bus bar sheet in accordance with the teachings and principles of the disclosure.

FIG. 15 illustrates a close up view of a portion of a bus bar sheet 1502 and battery cells 1506. The bus bar sheet 1502 includes a sheet of metal, such as copper, with battery contact portions 1504 that correspond to electrodes or terminals of the battery cells 1506. The bus bar sheet 1502 may be created by stamping out sections of the sheet surrounding battery contact portions 1504. The battery contact portions 1504 remain electrically attached to the bus bar sheet 1502, but are sufficiently thermally isolated so that they can be welded or soldered to terminals or electrodes of the battery cells 1506. The plurality of battery contact portions 1504 is arranged in a two dimensional manner to allow a single bus bar sheet 1502 to contact and/or be welded to a plurality of battery cells 1506.

In addition to providing electrical contact and connection to the battery cells 1506, the bus bar sheet 1502 also provides structural support to hold the battery cells 1506 in place even in the presence of vibrations or jostling of a battery assembly. For example, each welded/soldered cut out portion is supported by the bus bar sheet 1502 and thus provides lateral (from the perspective of FIG. 15) support to limit movement of the battery cells 1506. The bus bar sheet 1502 also provides uniform and efficient cooling of the battery cells 1506.

The bus bar sheet 1502 also provides high quality electrical contacts to the battery cells 1506 with minimal wiring or interconnects. For example, a single bus bar sheet 1502 may be used to connect to a large number of battery cells 1506. For example, a single bus bar sheet 1502 may be connected to 70 or more battery cells 1506. Some embodiments may include bus bar sheets 1502 that connect to a hundred, multiple hundreds, or more battery cells. Bus bar sheets 1502 may also be positioned on both sides of the battery cells 1506 to connect a plurality of positive or negative terminals on each side. Due to the large number of electrical connections that can be formed, a reduction in wiring and associated labor and time may be achieved. Additionally, the bus bar sheets 1502 perform well at drawing heat from the batteries to cool. For example, the bus bar sheet 1502 may draw heat from the battery cells 1506 and a cooling plate may draw heat from the bus bar sheet 1502 for efficient and controlled heating.

Figure 16:
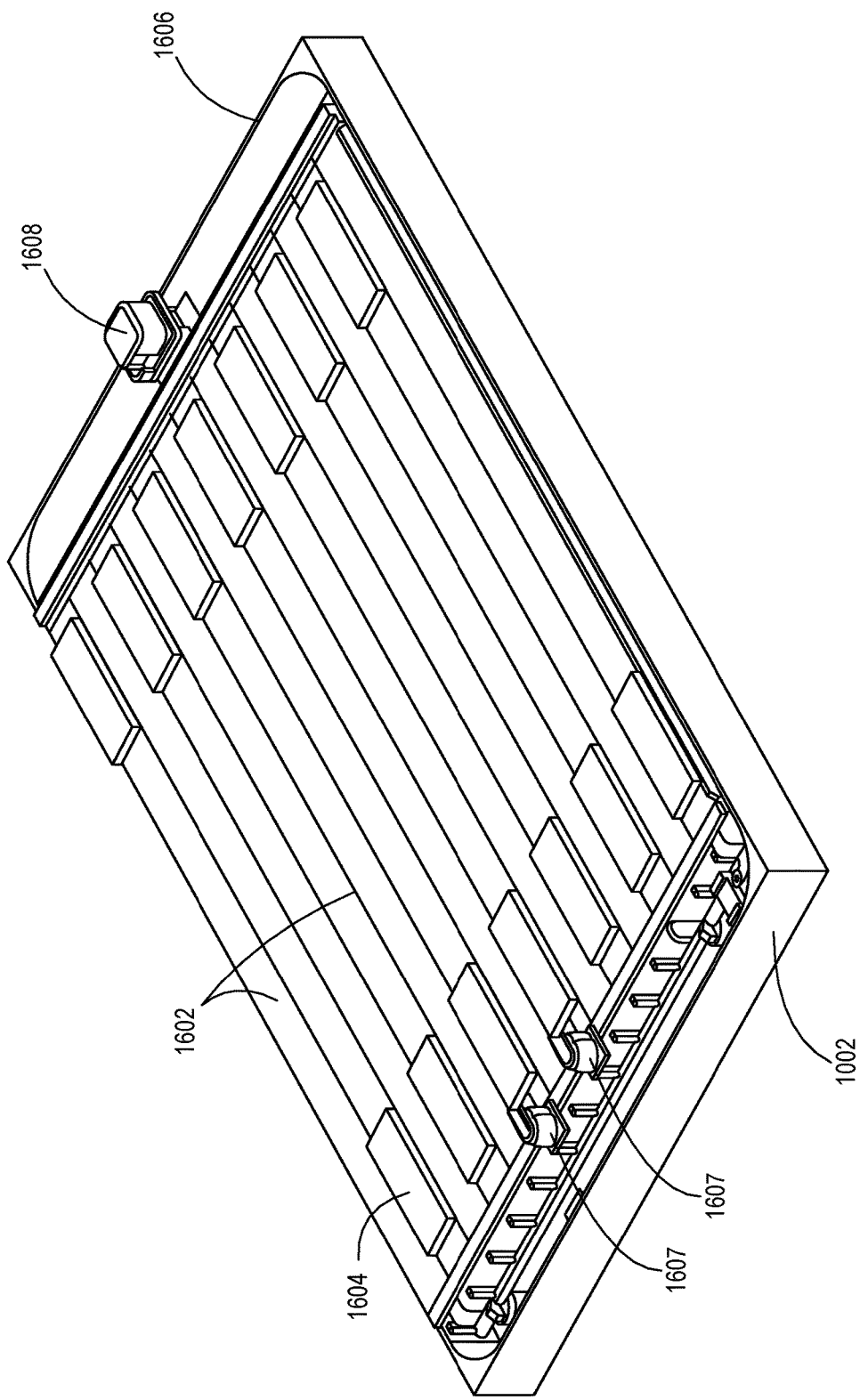
FIG. 16 is a perspective view of components of a battery array with a lid in place in accordance with the teachings and principles of the disclosure.

FIG. 16 illustrates a view with row covers 1602 and battery management units 1604 in place on each row. The row covers 1602 may be installed over each row of battery cells and the battery management units 1604 may perform battery management for the discharging, recharging, and/or health of battery cells in a corresponding row. A battery box lid 1606 (transparent) may be positioned on top of the battery box to seal or enclose the battery compartment. One or more electrical connectors 1607 may be exposed through the battery box lid 1606 so that power can be provided to a load, such as UTV motors, control panel or the like. A service disconnect 1608 may be provided to provide a break in a circuit, such as in the battery.

Figure 17:
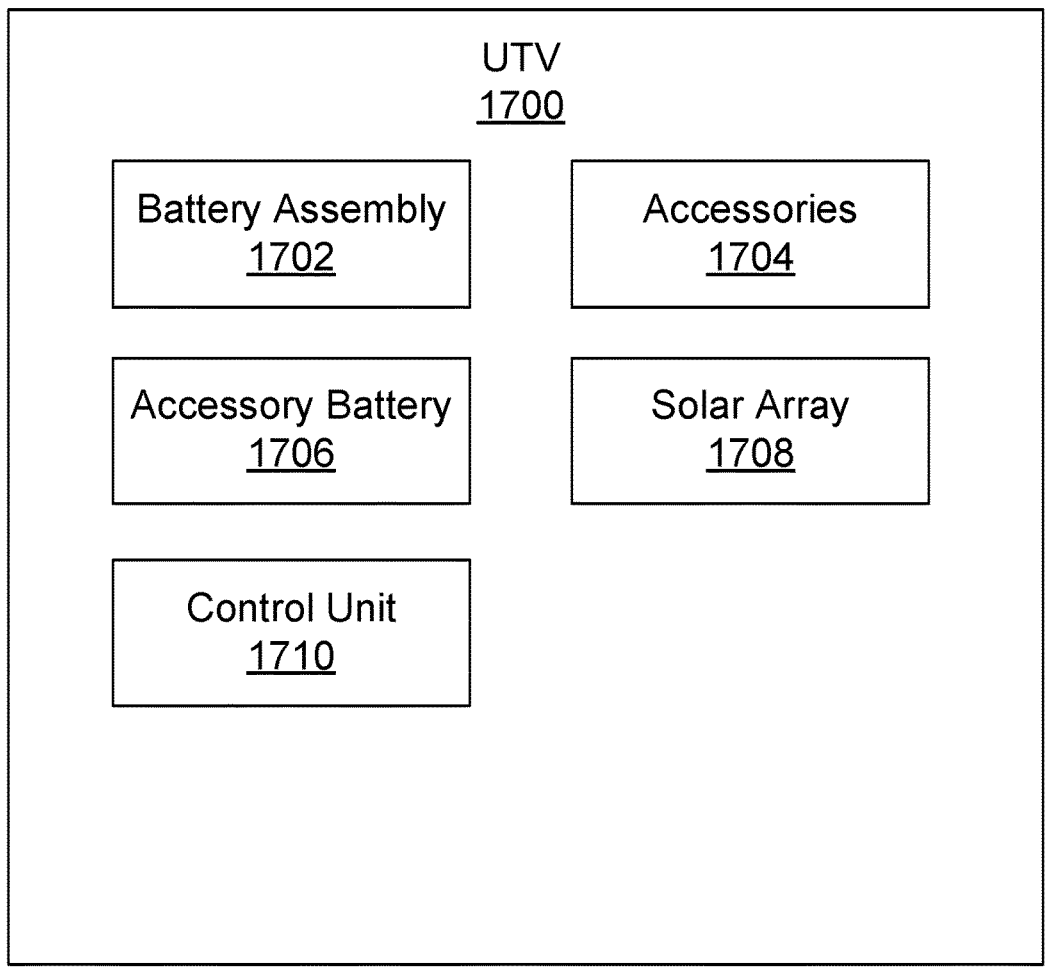
FIG. 17 is a schematic block diagram illustrating example components of a UTV in accordance with the teachings and principles of the disclosure.

FIG. 17 is a schematic block diagram illustrating example components of a UTV 1700. The UTV 1700 includes a battery assembly 1702, accessories 1704, an accessory battery 1706, a solar array 1708, and a control unit 1710. The components 1702-1710 are given by way of example only and may not all be included in all embodiments.

The battery assembly 1702 includes a battery array for storing/providing electricity for driving one or more motors of a vehicle. For example, the battery assembly 1702 may include the battery assembly 802 or other battery features or components disclosed and described in relation to FIGS. 1-16.

The accessories 1704 may include electronic devices or systems to assist during the driving, operation, or use of the UTV 1700. For example, the accessories 1704 may include an instrument panel, a winch, an external light, a cabin light, an accessory power outlet, a display screen, a camera, a radio transceiver for wireless voice or data communication, or the like.

The accessory battery 1706 may include a 12 volt battery, such as a lead acid or other battery, for powering the accessories 1704. The accessory battery 1706 may provide electrical power to accessories to limit usage of power from the battery cells of the battery assembly 1702. For example, the battery assembly 1702 may be used for the motors or drive train while the accessory battery 1706 is used for accessories 1704.

The solar array 1708 includes one or more solar panels for generating electricity to power the accessories 1704, recharging the accessory battery 1706, and/or recharging the cells of the battery assembly 1702. The solar array 1708 may include solar panels mounted on a roof of the UTV 1700, such as above a cabin area of the UTV 1700. The solar array may include two 300 watt solar panels on the roof to power the accessories or recharge a battery.

The control unit 1710 is configured to control operation of the UTV 1700. In one embodiment, the control unit 1710 controls a drive train and motors to drive the vehicle. The control unit 1710 may include a drive by wire system that receives input from an accelerator pedal, a brake pedal, a steering wheel, drive train sensors (such as current wheel/motor speeds, etc.), or the like. Based on the input, the control unit 1710 can control movement or driving of the vehicle to match the user's input and/or current conditions of the UTV 1700. In one embodiment, the control unit 1710 provides independent and dynamic control of each motor/wheel to provide "torque vectoring" to improve turning, tire wear, or the like.

The control unit 1710 may also provide power management for the battery assembly 1702 and/or the accessory battery 1706. For example, the control unit 1710 may turn off or disable different features based on a power level of the battery assembly 1702. If the charge level is low, the control unit 1710 may disable certain accessories, or modify driving characteristics to most efficiently use remaining battery power.

In one embodiment, the control unit 1710 may receive over-the air updates via a radio transceiver. The control unit 1710 may also enforce driving profiles based on a key, RFID tag, or the like, of the current driver.

In one embodiment, the UTV is 100% electrically powered. The UTV includes four passenger side by side seats. The UTV may include a battery pack that may range between about 50 kilo-watt hour (kWhr) to about 110 kWhr with electric motors that may provide up to or over about 200 to about 620 total Horsepower, up to or over 480 ft. lbs. of torque, up to or over 20 inches of suspension travel on all 4 wheels, and at least 100 to 150 miles of range per charge. The components are air tight with the ability to be submerged. The UTV may include a single electric motor for each wheel (4×4) having about 50 Horsepower to about 155 Horsepower, such that the motors may produce 0-60 acceleration times between about three to about eight seconds. Most of the UTV's components sit at or below the frame rail, thereby lowering the center of gravity and improving anti-roll over capabilities that exceed that of most other UTV's. Low center of gravity was accomplished by removing the gasoline engine, clutch and emission equipment, and design of the battery assembly. Benefits of removing the gasoline drive train include: increased suspension travel, better handling, reduction in greenhouse gas emissions, quieter ride and no belts or clutches to fail.

The UTV's electric motors may be powered by a liquid-cooled, 400-volt, 50 kWh lithium-ion battery pack (over 4,000 lithium cells). The four independent electric motors absorb the braking energy and deliver it back to the batteries, cutting the braking distance (in half by some estimates) while increasing range and safety. The UTV can be charged with either an 110V outlet, J1772 standard electric vehicle fast charger, or a custom 400V custom generator for rapid charging. The UTV includes two 300 watt solar panels on the roof to keep a 360-amp hour 12-volt lithium accessory battery bank topped off, reducing the need to pull energy from the larger 400-volt pack to run the 12-volt components. The large 12-volt bank supplies power to the front and rear LED light bars, flood lights, ambient lights, dual 3,500 lb winches, touch screen displays, and 110-volt and 12-volt outlets.

Figure 18:
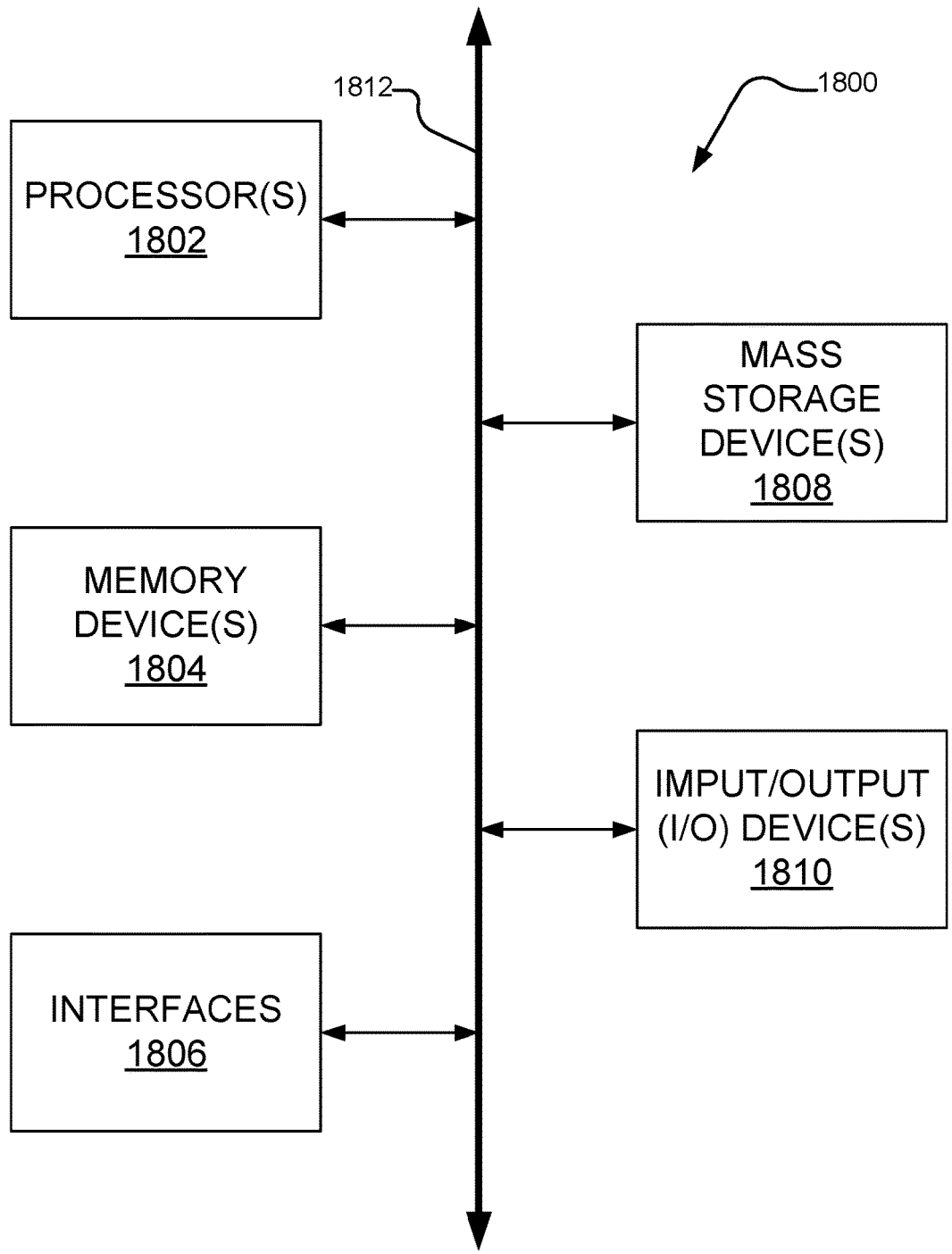
FIG. 18 is a block diagram depicting an example computing device that may be used in accordance with the teachings and principles of the disclosure.

FIG. 18 is a block diagram depicting an example computing device 1800. In some embodiments, computing device 1800 is used to implement one or more of the systems and components discussed herein, such as the control unit 1710 of FIG. 17. Further, computing device 1800 may interact with any of the systems and components described herein. Accordingly, computing device 1800 may be used to perform various procedures and tasks, such as those discussed herein. Computing device 1800 can function as a server, a client or any other computing entity. Computing device 1800 can be any of a wide variety of computing devices, such as a desktop computer, a notebook computer, a server computer, a handheld computer, a tablet, and the like.

Computing device 1800 includes one or more processor(s) 1802, one or more memory device(s) 1804, one or more interface(s) 1806, one or more mass storage device(s) 1808, and one or more Input/Output (I/O) device(s) 1810, all of which are coupled to a bus 1812. Processor(s) 1802 include one or more processors or controllers that execute instructions stored in memory device(s) 1804 and/or mass storage device(s) 1808. Processor(s) 1802 may also include various types of computer-readable media, such as cache memory.

Memory device(s) 1804 include various computer-readable media, such as volatile memory (e.g., random access memory (RAM)) and/or nonvolatile memory (e.g., read-only memory (ROM)). Memory device(s) 1804 may also include rewritable ROM, such as Flash memory.

Mass storage device(s) 1808 include various computer readable media, such as magnetic tapes, magnetic disks, optical disks, solid state memory (e.g., Flash memory), and so forth. Various drives may also be included in mass storage device(s) 1808 to enable reading from and/or writing to the various computer readable media. Mass storage device(s) 1808 include removable media and/or non-removable media.

I/O device(s) 1810 include various devices that allow data and/or other information to be input to or retrieved from computing device 1800. Example I/O device(s) 1810 include cursor control devices, keyboards, keypads, microphones, monitors or other display devices, speakers, printers, network interface cards, modems, lenses, CCDs or other image capture devices, and the like.

Interface(s) 1806 include various interfaces that allow computing device 1800 to interact with other systems, devices, or computing environments. Example interface(s) 1806 include any number of different network interfaces, such as interfaces to local area networks (LANs), wide area networks (WANs), wireless networks, and the Internet.

Bus 1812 allows processor(s) 1802, memory device(s) 1804, interface(s) 1806, mass storage device(s) 1808, and I/O device(s) 1810 to communicate with one another, as well as other devices or components coupled to bus 1812. Bus 1812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1800, and are executed by processor(s) 1802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended convey the implementation apparatus for accomplishing a process, such as by hardware, or a combination of hardware, software, and/or firmware, for the purposes of performing all or parts of query operations.

EXAMPLES

Example 1 is a battery assembly that includes a battery housing, a battery array, and one or more cooling plates. The battery housing forms a battery compartment having a width and length greater than a height. The battery array includes a plurality of cylindrical battery cells oriented with an axis perpendicular to the height of the battery compartment. The plurality of cells is organized into a plurality of rows within the battery compartment. The one or more cooling plates are oriented perpendicular to the axis of the battery cells and positioned proximal to an end of battery cells within a row of the plurality of rows.

In Example 2, one or more cooling plates as in Example 1 include at least one cooling plate positioned between battery cells of a first row of the plurality of rows and battery cells of a second row of the plurality of rows. The cooling plates draw heat from battery cells within the first row and the second row.

In Example 3, battery cells as in any of Examples 1-2 include an electrode at each end. The battery assembly further includes an electrical insulator positioned between the electrode and a proximal cooling plate, wherein the electrical insulator comprises a thermal conductor.

In Example 4, a battery assembly as in any of Examples 1-4 further includes a bus bar electrically connecting a plurality of the battery cells. The bus bar includes a conductive sheet with a plurality of cut-out portions each corresponding to an electrode of a battery cell. At least part of a circumference of the cut out portions is connected to the conductive sheet.

In Example 5, a bus bar as in Example 4 is substantially parallel to the cooling plates and positioned between the cooling plates and electrodes of the battery cells.

In Example 6, a specific cut-out portion as in any of Examples 4-5 is welded or soldered to an electrode of a corresponding battery cell.

In Example 7, a row of the plurality of rows of battery cells as in any of Examples 1-6 includes a width corresponding to a length of one battery cell and a height corresponding to a height of stacked battery cells.

In Example 8, a battery assembly as in any of Examples 1-7 further includes a coolant pump and a fluid coolant including one or more of water and a refrigerant. The coolant pump pumps the fluid coolant through the cooling plates to maintain a temperature of the battery assembly within a defined temperature range.

Example 9 is an UTV that includes a battery assembly. The battery assembly includes a battery housing, a battery array, and one or more cooling plates. The battery housing forms a battery compartment having a width and length greater than a height. The battery array includes a plurality of cylindrical battery cells oriented with an axis perpendicular to the height of the battery compartment. The plurality of cells is organized into a plurality of rows within the battery compartment. The one or more cooling plates are oriented perpendicular to the axis of the battery cells and positioned proximal to an end of battery cells within a row of the plurality of rows.

In Example 10, one or more cooling plates as in Example 9 include at least one cooling plate positioned between battery cells of a first row of the plurality of rows and battery cells of a second row of the plurality of rows. The cooling plates draw heat from battery cells within the first row and the second row.

In Example 11, battery cells as in any of Examples 9-10 include an electrode at each end. The battery assembly further includes an electrical insulator positioned between the electrode and a proximal cooling plate, wherein the electrical insulator comprises a thermal conductor.

In Example 12, a battery assembly as in any of Examples 9-11 further includes a bus bar electrically connecting a plurality of the battery cells. The bus bar includes a conductive sheet with a plurality of cut-out portions each corresponding to an electrode of a battery cell. At least part of a circumference of the cut out portions is connected to the conductive sheet.

In Example 13, a bus bar as in Example 12 is substantially parallel to the cooling plates and positioned between the cooling plates and electrodes of the battery cells.

In Example 14, a specific cut-out portion as in any of Examples 12-13 is welded or soldered to an electrode of a corresponding battery cell.

In Example 15, a row of the plurality of rows of battery cells as in any of Examples 9-14 includes a width corresponding to a length of one battery cell and a height corresponding to a height of stacked battery cells.

In Example 16, a battery assembly as in any of Examples 9-15 further includes a coolant pump and a fluid coolant including one or more of water and a refrigerant. The coolant pump pumps the fluid coolant through the cooling plates to maintain a temperature of the battery assembly within a defined temperature range.

In Example 17, a battery housing as in any of Examples 9-16 includes a battery box and a lid. The battery assembly provides support for, or is located under, a floor of a cabin of the UTV.

Example 18 is an apparatus including means to realize a system or apparatus as in of any of Examples 1-17.

Example 19 is a battery assembly that includes a battery housing, a battery array, a bus bar, and one or more cooling plates. The battery housing includes a battery box and a battery lid forming a battery compartment. The battery array includes a plurality of cylindrical battery cells positioned within the battery compartment. The bus bar electrically connects a plurality of the battery cells, and includes a conductive sheet with a plurality of cut-out portions each corresponding to an electrode of a battery cell. The one or more cooling plates are located at an end of one or more of the cylindrical cells.

In Example 20, a battery assembly as in Examples 18 that further includes each of the battery cells having one or more contacts for electrical output at a first surface, wherein the cooling plate is substantially parallel to the first surface.

In Example 21, a battery assembly as in any of Examples 19-20 further includes a specific cut-out portion is welded to an electrode of a corresponding battery cell.

In Example 22, a battery assembly as in any of Examples 19-21 further includes a coolant pump and a fluid coolant comprising one or more of water and a refrigerant, wherein the coolant pump pumps the fluid coolant through the cooling plates to maintain a temperature of the battery assembly within a defined temperature range.

In Example 23, a battery assembly as in any of Examples 19-22 further includes the battery housing has a width and length greater than a height, the plurality of cylindrical battery cells are oriented with an axis perpendicular to the height of the battery compartment, wherein the plurality of cells are organized into a plurality of rows within the battery compartment, and the one or more cooling plates are oriented perpendicular to the axis of the battery cells and positioned proximal to an end of battery cells within a row of the plurality of rows.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:
1. A battery assembly comprising:
   a battery housing forming a battery compartment having a width and length greater than a height;
   a battery array comprising a first row of cylindrical battery cells, a second row of cylindrical battery cells, and a third row of cylindrical battery cells parallel to each other and oriented with an axis perpendicular to the height of the battery compartment;

a first cooling plate oriented perpendicular to the axis of the battery cells and positioned between the first row of cylindrical battery cells and the second row of cylindrical battery cells;

a second cooling plate oriented perpendicularly to the axis and positioned between the second row of cylindrical battery cells and the third row of cylindrical battery cells, wherein the first and the second cooling plates are fluidly coupled to an end plate, wherein a coolant is conducted through the first and second cooling plates via the end plate;

a first conducting plate positioned between the first row of cylindrical battery cells and the first cooling plate and electrically connecting the electrodes of each of the cells of the first row of cylindrical battery cells, wherein the first conducting plate comprises a plurality of cut-out portions each corresponding to the electrodes of each of the cells of the first row of cylindrical battery cells, and wherein a specific cut-out portion is electrically coupled to the electrode of each of the cells of the first row of cylindrical battery cells; and an electrically insulating thermal layer positioned adjacent the first conducting plate, between the electrode of each of the cells of the first row of cylindrical battery cells and the first cooling plate.

2. The battery assembly of claim 1, wherein the first and second cooling plates draw heat from battery cells within the first row and the second row.

3. The battery assembly of claim 1, wherein a row of the plurality of rows comprises a width corresponding to a length of one battery cell and a height corresponding to a height of stacked battery cells.

4. The battery assembly of claim 1, further comprising a coolant pump and a fluid coolant comprising one or more of water and a refrigerant, wherein the coolant pump pumps the fluid coolant through the end plate and the first and second cooling plates to maintain a temperature of the battery assembly within a defined temperature range.

5. An electric utility task vehicle (UTV) comprising:
a battery assembly, the battery assembly comprising:
a battery housing forming a battery compartment having a width and length greater than a height;
a battery array comprising a first row of cylindrical battery cells, a second row of cylindrical battery cells, and a third row of cylindrical battery cells parallel to each other and oriented with an axis perpendicular to the height of the battery compartment;

a first cooling plate oriented perpendicular to the axis of the battery cells and positioned between the first row of cylindrical battery cells and the second row of cylindrical battery cells;

a second cooling plate oriented perpendicularly to the axis and positioned between the second row of cylindrical battery cells and the third row of cylindrical battery cells, wherein the first and the second cooling plates are fluidly coupled to an end plate, wherein a coolant is conducted through the first and second cooling plates via the end plate;

a first conducting plate positioned between the first row of cylindrical battery cells and the first cooling plate and electrically connecting the electrodes of each of the cells of the first row of cylindrical battery cells, wherein the first conducting plate comprises a plurality of cut-out portions each corresponding to the electrodes of each of the cells of the first row of cylindrical battery cells, and wherein a specific cut-out portion is electrically coupled to the electrode of each of the cells of the first row of cylindrical battery cells; and an electrically insulating thermal layer positioned adjacent the first conducting plate, between the electrode of each of the cells of the first row of cylindrical battery cells and the first cooling plate.

6. The electric UTV of claim 5, wherein the first and second cooling plates draw heat from battery cells within the first row and the second row.

7. The electric UTV of claim 5, wherein a row of the plurality of rows comprises a width corresponding to a length of one battery cell and a height corresponding to a height of stacked battery cells within a row of the plurality of rows.

8. The electric UTV of claim 5, further comprising a coolant pump wherein the coolant pump pumps the refrigerant through the end plate and the first and second cooling plates to maintain a temperature of the battery assembly within a defined temperature range.

9. The electric UTV of claim 5, wherein the battery housing comprises a battery box and a lid, and wherein the battery assembly provides support for, or is located under, a floor of a cabin of the UTV.

* * * * *